United States Patent Office  3,219,705
Patented Nov. 23, 1965

3,219,705
MANUFACTURE OF N-CYCLOHEXYL N'-PHENYL-p-PHENYLENEDIAMINE
James O. Harris, St. Albans, W. Va., assignor to Monsanto Company, a corporation of Delaware
No Drawing. Filed Feb. 2, 1961, Ser. No. 86,603
3 Claims. (Cl. 260—576)

This invention relates to the manufacture of N-cyclohexyl-N'-phenyl-p-phenylenediamine in a simple and efficient manner.

In accordance with this invention p-cyclohexylamino nitrobenzene, which is readily available from the condensation of cyclohexylamine and p-chloronitrobenzene, is heated with cyclohexanone and a hydrogenation catalyst. "Hydrogenation catalyst" is employed in a generic sense to indicate that class of catalysts which effect transfer of hydrogen in organic compounds and includes catalysts variously referred to as hydrogenation or dehydrogenation catalysts. Suitable examples include metals, as for example cobalt, chromium, copper, iron, manganese, nickel, osmium, palladium, platinum, titanium, zinc and Raney nickel. Similarly, these metals in the form of oxides, sulfides, chromates, nitrates, tungstates, uranates, manganates, manganites and formates may be used. Also included are compound metals as for instance copper with silver, chromium or zinc, nickel with alumina, zinc, cobalt or copper. Activated charcoal, activated alumina, silica gel and magnesite are hydrogenation catalysts although they are preferably used in conjunction with other catalytic substances. Further examples comprise multi-component catalyst compositions or catalysts used with promoters. Typical examples include a combination of molybdenum trioxide and phosphorus pentoxide with copper oxide or lead oxide or zinc oxide, a mixture of chromium oxide and aluminum oxide, a mixture of the oxides of copper, chromium and barium, a mixture of magnesite, lead chromate, copper or copper sulfide or activated alumina, a mixture of sulfides of molybdenum, magnesium and zinc. Still other examples are hydrolyzed nickel-alkaline earth metal alloys. The catalyst material may be incorporated with or deposited on a carrier, as for example diatomaceous earth, clay, pumice or kieselguhr.

The temperature at which the process is carried out will vary depending upon the activity of the catalyst. Palladium catalyst is much to be preferred and with it and other platinum metal catalysts reaction may be effected within the range of 150–300° C. These are not the absolute operating limits, however, and the reaction may be carried out at lower temperatures and at higher temperatures below decomposition temperature. However, at temperatures above 300° C. decomposition becomes significant. Cyclohexanone is required in molar excess. The course of the reaction is unknown and undoubtedly involves a complicated series of reactions. The invention is not limited to any theory or opinion as to the mechanism by which the product forms.

The following example illustrates the invention in further detail.

Into a glass or glass-lined reactor was charged 16.5 grams (0.075 mole) of N-cyclohexyl-p-nitroaniline, 2 grams of 5% palladium on carbon and 50 ml. of cyclohexanone. The reactor was swept out with nitrogen and the charge heated while distilling out by-product water. The by-product water was trapped and the course of the reaction followed by the noting the water collected. The first water separated when the temperature reached about 160° C. Heating was continued at 161–174° C. for about an hour during which time 4.5 ml. of water was collected. The reaction mixture was then cooled to room temperature, filtered and the filter washed with about 10 ml. of cyclohexanone. The filtrate and washings were distilled in vacuo to a pot temperature of 200° C. under 8 mm. Hg. Stirring the syrupy residue with about 50 ml. of petroleum ether resulted in crystallization. The solids were filtered, washed with petroleum ether and air dried to obtain 36% yield of N-cyclohexyl-N'-phenyl-p-phenylenediamine with a melting point 113–118° C.

It is intended to cover all changes and modifications of the examples of the invention herein chosen for purposes of disclosure which do not constitute departures from the spirit and scope of the invention.

What is claimed is:
1. The method which consists essentially of heating p-cyclohexylamino nitrobenzene and cyclohexanone with platinum metal catalyst at a temperature sufficient to form by-product water from the reactants but below about 300° C. thereby forming N-cyclohexyl-N'-phenyl-p-phenylenediamine.

2. The method which consists essentially of heating p-cyclohexylamino nitrobenzene and cyclohexanone with palladium catalyst at a temperature sufficient to form by-product water from the reactants but below about 300° C. thereby forming N - cyclohexyl-N'-phenyl-p-phenylenediamine.

3. The method which consists essentially of heating p-cyclohexylamino nitrobenzene and molar excess of cyclohexanone with palladium catalyst at a temperature sufficient to form water of condensation from the reactants but below about 300° C. while removing by-product water from the reaction zone thereby forming N-cyclohexyl-N'-phenyl-p-phenylenediamine.

References Cited by the Examiner
UNITED STATES PATENTS

| | | | |
|---|---|---|---|
| 2,413,598 | 12/1946 | Ballard et al. | 260—578 |
| 2,883,362 | 4/1959 | Rosenwald et al. | 260—576 |
| 3,014,967 | 12/1961 | Chapman | 260—576 |

CHARLES B. PARKER, *Primary Examiner.*